Aug. 27, 1929.  D. L. DRISCOLL  1,725,902
UNIVERSAL HANGER FOR WELL DRILLING TOOLS
Filed March 30, 1925  2 Sheets-Sheet 1
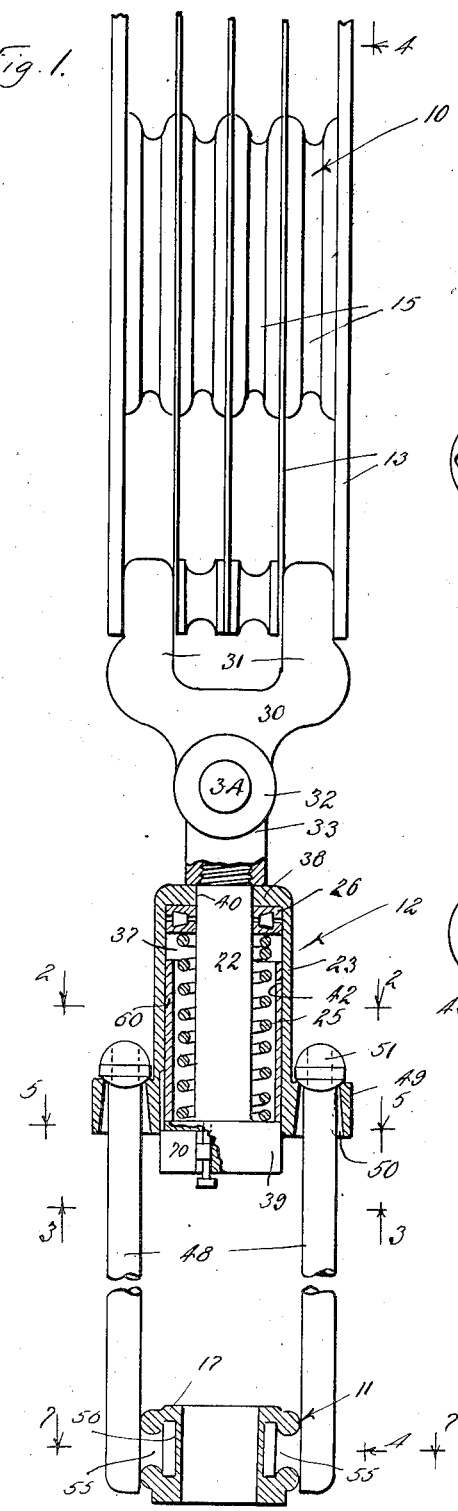
Inventor
Dennis L. Driscoll
by
his Attorney Aug. 27, 1929.　　　　D. L. DRISCOLL　　　　1,725,902
UNIVERSAL HANGER FOR WELL DRILLING TOOLS
Filed March 30, 1925　　2 Sheets-Sheet 2
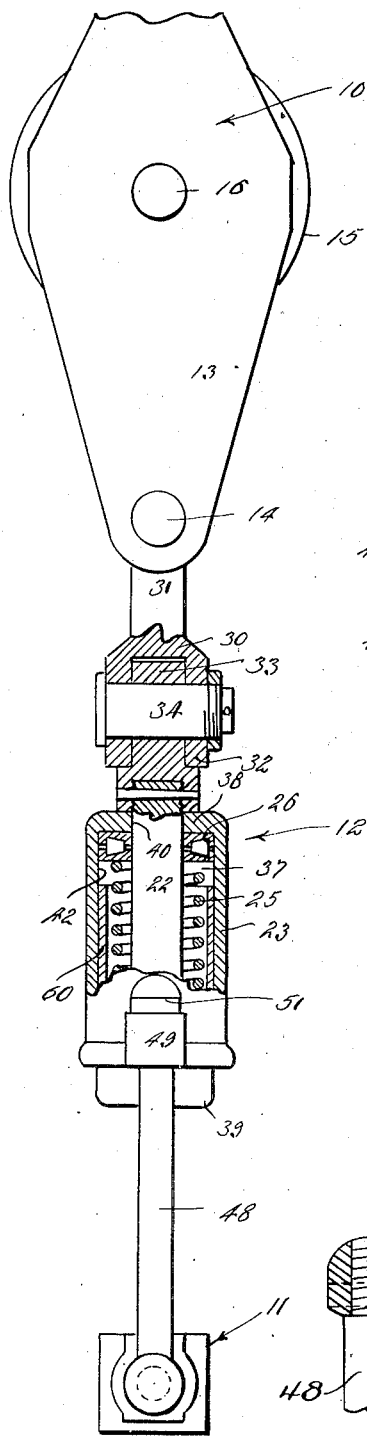
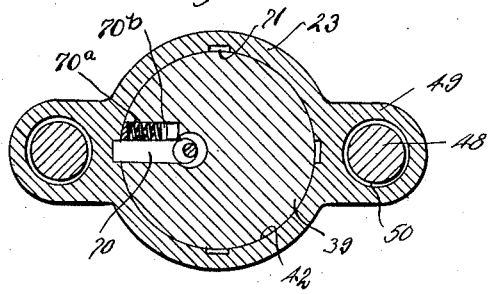
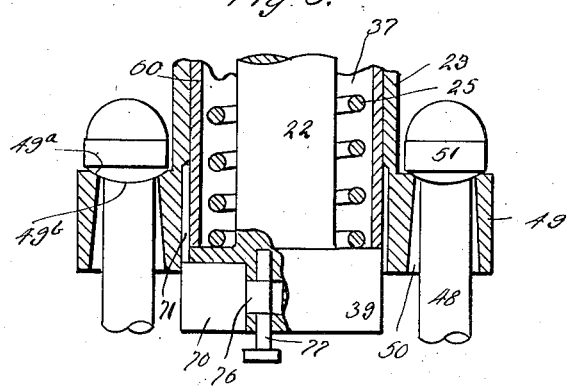
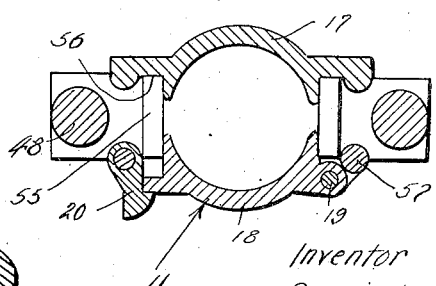
Inventor
Dennis L. Driscoll
by
his Attorney Patented Aug. 27, 1929.

1,725,902

UNITED STATES PATENT OFFICE.

DENNIS L. DRISCOLL, OF ALHAMBRA, CALIFORNIA.

UNIVERSAL HANGER FOR WELL-DRILLING TOOLS.

Application filed March 30, 1925. Serial No. 19,229.

This invention has to do with a connector for well drilling tools and has particular reference to apparatus for use in handling objects or equipment in a derrick.

In accordance with standard practice, swivels, elevators and other tools are usually supported in the derrick of a well drilling rig from a traveling block, the connection between the tools and block being made by a hook connected to the traveling block by a link or other like device. In some cases springs have been embodied in the hooks for the purpose of introducing resilient means in the connection. This standard apparatus or equipment is not altogether safe because of the constant danger of the tool becoming disengaged from the hook and is not altogether satisfactory in operation in that the parts are not properly balanced and are not properly centered.

An object of my present invention is to provide apparatus of the general character just referred to in which the various parts are connected so that they cannot become accidentally disengaged.

Another object of my invention is to provide apparatus of the character mentioned in which the parts are balanced and the strains equalized so that work is evenly and uniformly held by the tool.

A further object of my invention is to introduce yielding means for instance, in the form of a spring, into apparatus such as I have mentioned in a manner to operate effectively in relieving the parts of shock and sudden strains such as they are sometimes subjected to.

Another object of my invention is to provide a connector which may be made without welded connections and so that the various parts fit accurately together, thus assuring safety, balance and proper distribution of strains.

A further object of the invention is to provide a connection between tool supporting parts or rods and a carrier which is particularly secure and allows desirable flexibility between the rods and carrier.

The various objects and features of my invention will be best and more fully understood from the following detailed description of a typical and preferred form of my invention throughout which description reference is had to the accompanying drawings in which Fig. 1 is a view showing the apparatus provided by my invention, certain parts being shown in section.

Fig. 2 is a transverse plan sectional view taken as indicated by line 2—2 on Fig. 1.

Fig. 3 is a transverse sectional view taken as indicated by line 3—3 on Fig. 1.

Fig. 4 is a view taken as indicated by line 4—4 on Fig. 1, certain parts being shown in section.

Fig. 5 is a transverse sectional view taken as indicated by line 5—5 on Fig. 1.

Fig. 6 is an enlarged detail view of a portion of Fig. 1.

Fig. 7 is a plan section taken as indicated by line 7—7 on Fig. 1; and

Fig. 8 is a sectional view of the upper end of the supporting rod.

In the drawings numeral 10 designates, generally, a traveling block, numeral 11 a tool for use in connection with or for handling objects or apparatus in a derrick and numeral 12 a connection between the block 10 and tool 11.

The traveling block 10 illustrated in the drawings is of the form and construction usual to traveling blocks employed in well drilling rigs and comprises, generally, a frame including a plurality of plates 13 secured together at their upper and lower ends by tie bolts 14 and a plurality of pulleys 15 mounted between the plates on a bearing pin 16. The block 10 when in operation carries a cable by which it is moved through the derrick of the well drilling rig as desired.

The tool 11 may, in accordance with the broader aspects of this invention be any suitable tool for use in connection with or for handling objects or apparatus in a rig. I have for purpose of example shown the tool 11 in the form of an elevator comprising a body 17, a closure or a gate 18, connected to the body 17 by a pivot pin 19, and a latch device 20 for holding the body and closure in closed position on a casing, or the like. It is to be understood that this particular form of elevator is not to be construed as limiting the broader aspects of my invention in any way and that when I use the term "tool" I mean to include not only an elevator of any desired construction but also any other device or apparatus like or similar to an elevator, and which may be employed in carrying out the principles of my invention.

The connection 12 between the tool and block includes a carrier comprising a vertical stem 22 and a sleeve 23 operable on the stem, a universal connection between the upper end of the stem and the block 10, a connection between the sleeve 23 and tool 11 whereby the tool is supported from the sleeve, a spring 25 arranged so that the sleeve is resiliently supported on the stem 22, a bearing 26 arranged so that the tool 11 may be freely rotated relative to the block, and means for setting the parts against relative rotary movement so that the tool cannot turn relative to the block.

In the particular form of universal joint connection illustrated in the drawing, connecting the block 10 and the upper end of the stem 11, includes a link member 30 having spaced upwardly extending arms 31, which project between the plates 13 of the block to be carried by the tie bolt 14 at the lower end of the block, and spaced downwardly extending arms 32 which receive a head 33 provided on the upper end of the stem 22. A pin 34 passes through the arms 32 and head 33 to pivotally connect them as shown in Figs. 1 and 4 of the drawings. The arms 31 and 32 are disposed at right angles to each other so that the pin 34 is at right angles to the tie bolt 14 thus allowing the stem 22 universal movement relative to the block. It is to be noted that the parts are arranged and connected so that the stem is supported in vertical alignment with the block and that the parts may be disconnected by removing the pin 34. The head 33 is screw threaded to the stem in the manner illustrated throughout the drawings. In the drawings the head is shown somewhat larger in diameter than the stem 22 and provided with a screw threaded socket 36 which receives the upper end of the stem.

The sleeve 23 is carried on the stem 22 for rotation and also longitudinal movement with relation thereto. In the particular form of construction shown in the drawings the sleeve 23 freely fits the stem 22 so that there is a substantial space 37 between the sleeve and stem. A suitable bearing connection is made between the stem 22 and sleeve 23 by means of an inwardly extending flange 38 at the upper end of the sleeve and an enlargement or outwardly extending flange 39 at the lower end of the stem. I have for example shown the flanges integral with the sleeve and stem. The flange 38 at the upper end of the sleeve has an opening 40 which slidably carries the stem while the flange 39 at the lower end of the stem slidably fits the opening 42 in the sleeve. This gives a spaced bearing support between the stem and sleeve.

The spring 25, which provides the resiliency between the block 10 and the tool 11, is preferably arranged within the sleeve for instance in the space 37 between the sleeve and stem. The spring 25 may be a comparatively heavy compression spring helical in form and arranged to surround the stem 22 as clearly illustrated in Figs. 1 and 2 and 4 of the drawings. The spring 25 when arranged in this manner reacts against the flanges 38 and 39 to normally yieldingly hold the sleeve and stem in the positions illustrated throughout the drawings. The flange 38 at the upper end of the sleeve cooperates with the head 33 on the stem to limit the movement of the stem and sleeve by the spring.

In the preferred form of the invention the bearing 26, provided for allowing free rotation on the tool 11 with relation to the block 10, is preferably a suitable form of anti-friction bearing, and is preferably located within the sleeve 23, for instance, between the spring 25 and one of the flanges. In the drawings I have shown the bearing 26 as a roller bearing. In the drawings I have illustrated a roller bearing interposed between the upper end of the spring and the flange 38.

The connection between the sleeve 23 and tool 11 is preferably in the form of two supporting rods 48 which extend downwardly from lugs 49 provided on the sleeve 23. The lower portions of the rods connect to the tool 11. In the preferred form of construction the supporting rods extend freely through openings 50 provided in the lugs 49, the openings being downwardly divergent to allow for some movement of the rods relative to the sleeve. Suitable heads 51 are provided on the upper ends of the rods 48 above the lugs 49 to prevent displacement of the rods from the lugs. In the construction shown in the drawings the heads are in the form of nuts screw threaded on the upper ends of the rods in order to facilitate assembly of the device. With this construction the lugs may be solid and integral with the sleeve as shown in the drawings. I prefer to provide the upper sides of the lugs with seats 49ª to receive the spherical faces 49ᵇ of the heads 51. The rods 48 are made sufficiently long to support the tool 11 the desired distance below the stem and other parts. In accordance with the broader aspects of my invention any suitable means may be provided for connecting the tool 11 with the lower ends of supporting rods 48. I have in the drawings shown lateral inwardly extending projections 55 on the lower end portions of the rods 48, which projections extend into suitable sockets 56 in opposite sides of the elevator body 17 where they are retained by suitable pins 57.

With the construction thus far described a load applied to the apparatus through the tool 11 is transmitted to the sleeve 23 by the supporting rods 48 and in turn causes compression of the spring 25. A certain amount of resiliency such as may be obtained for the spring 25 is highly desirable, however, it is desirable to provide means whereby the load after exceeding a certain amount is positively supported through the sleeve and stem so therefore I have provided positive stop means between the sleeve and stem to come into action after a certain amount of operation of the spring 25. This stop means may be in the form of a spacer sleeve 60 arranged within the sleeve 23 in the manner shown in Figs. 1 and 4 of the drawings. The sleeve 60 may be fitted loosely in the sleeve 23 and may be proportioned, that is, as to length so as to positively stop downward movement of the sleeve relative to the stem after any desired amount of compression of the spring 25. In the arrangement in which the bearing 26 is located in the sleeve 23 the spacer sleeve 60 operates to engage the bearing to form a positive connection between the flanges 38 and 39 through the bearing 26.

In accordance with my invention I provide stop means in connection with the sleeve and stem whereby these parts may be set against rotary movement without interfering with their vertical operation. This stop means may comprise a locking block 70 carried by one of the parts, for instance, by the stem 22 to cooperate with one or more longitudinal grooves 71 provided at the desired points around the inner wall of the sleeve 23. In the particular arrangement shown in the drawings there are four grooves 71 in the sleeve 23 making it possible to lock the sleeve and stem in four different rotative positions. The locking block as shown in the drawings is normally held in, or retracted, by a spring 70$^a$ engaging a projection 70$^b$ on the block as shown in Fig. 5. As means for operating the locking block to extend into a groove and for holding it thus extended I have shown a cam 76 mounted on a suitable operating shaft 77. By rotating the shaft 77 the cam may be thrown into and out of position where it operates the locking block.

In operation the traveling block 10 may be supported in the derrick in the usual manner and work may be applied to or handled by the tool 11 in the usual manner. The load applied to the apparatus through the tool 11 is transmitted through the vertical suspension rods 48 to the sleeve 23. As load is applied to the sleeve 23 it moves downwardly on the stem 21 against the resistance of the spring 25 until, if the load is great enough, the bearing 26 engages the spacer sleeve 60 in which case the load is positively transmitted to the stem 22 which in turn communicates it directly to the block through the universal connection. The universal connection between the stem and block allows the parts to hang or assume a truly vertical position and the various parts of the apparatus being balanced or symmetrical tend to assume a truly vertical position and therefore operate to hold the work carried by the tool 11 in a vertical position and in alignment with the block and stem. When the locking device hereinabove described is released the tool 11 is free to rotate relative to the block 10 at any time and when the locking device is set the tool is effectively held in one rotating position with relation to the stem and block.

Having described only a typical preferred form of my invention I do not wish to limit myself to the specific details set forth, but wish to reserve to myself any changes or variations that may appear to those skilled in the art or fall within the scope of the following claims:

Having described my invention, I claim:

1. A device for use in a well drilling rig including, a stem, a sleeve carried by the stem for rotary and longitudinal movement relative thereto, and releasable means for holding the stem and sleeve against relative rotation during full longitudinal movement between the sleeve and stem.

2. A device for use in a well drilling rig including, two parts one a stem, the other a sleeve freely carried on the stem, and releasable means for setting the stem and sleeve against relative rotary movement said means including a member operable to be projected from one part to slidably fit a longitudinal opening in the other part.

3. A device for use in a well drilling rig including, a stem, a sleeve carried by the stem for rotary and longitudinal movement relative thereto, and means for releasably setting the stem and sleeve for full relative longitudinal movement in a plurality of different fixed relative rotative positions.

4. A device of the character described including a carrier, a rod for supporting a tool, and means connecting the rod and carrier to allow a limited relative movement vertically between the rod and carrier, said means including a projection on the carrier having a vertical opening slidably passing the rod and an enlargement on the rod above the projection.

5. A device of the character described including a carrier, two spaced tool carrying rods, and means connecting the upper end portions of the rods with the carrier including projections at diametrically opposite sides of the carrier having vertical openings slidably passing the rods and heads on the upper ends of the rods to be in engagement with the projections when the rods are being operated through the carrier.

6. A device of the character described including a carrier, two spaced tool carrying rods, and means connecting the upper end portions of the rods with the carrier including projections at diametrically opposite sides of the carrier having vertical openings slidably passing the rods and seats at the upper sides of the projection, the rods being slidably carried in the openings, and heads on the upper ends of the rods adapted to be carried in the seats when the device is in operation.

7. A device of the character described having a vertical sleeve, an inwardly extending flange in the upper end of the sleeve, a stem arranged through the sleeve to slidably project through said flange, an outwardly extending flange at the lower end of the stem slidably fitting the lower portion of the sleeve, a compression spring within the sleeve between the flanges, projections at diametrically opposite sides of the sleeve having vertical openings through them, and tool carrying rods extending upwardly through the openings and having heads on their upper ends above the projections.

8. A device of the character described including a vertical sleeve, an inwardly extending flange at the upper end of the sleeve, a stem extending through the sleeve and slidably projecting through said flange, means connected with the upper end of the stem to connect the device with a hook for universal movement relative thereto, an outwardly extending flange on the lower end of the stem slidably fitting the lower portion of the sleeve, a vertical groove in the wall of the sleeve, a member carried by the stem to be projected therefrom into the groove, a compression spring carried in the sleeve between the flanges, a spacer sleeve carried in the first mentioned sleeve between the flanges to limit the movement between the stem and first mentioned sleeve in a direction to press the spring, projections on diametrically opposite sides of the first mentioned sleeve, the projections having vertical openings through them, tool carrying rods extending upwardly through the openings in the projections, and heads on the rods above the projections.

In witness that I claim the foregoing I have hereunto subscribed my name this 24th day of March 1925.

DENNIS L. DRISCOLL.